United States Patent
Jensen

(10) Patent No.: US 7,802,412 B2
(45) Date of Patent: Sep. 28, 2010

(54) METHOD OF CONSTRUCTING LARGE TOWERS FOR WIND TURBINES

(75) Inventor: Søren P. Jensen, Varde (DK)

(73) Assignee: Vestas Wind Systems A/S, Ringkobing (DK)

( * ) Notice: Subject to any disclaimer, the term of this patent is extended or adjusted under 35 U.S.C. 154(b) by 1048 days.

(21) Appl. No.: 10/549,807

(22) PCT Filed: Mar. 19, 2003

(86) PCT No.: PCT/EP03/02888

§ 371 (c)(1), (2), (4) Date: Jul. 19, 2006

(87) PCT Pub. No.: WO2004/083633

PCT Pub. Date: Sep. 30, 2004

(65) Prior Publication Data

US 2006/0272244 A1    Dec. 7, 2006

(51) Int. Cl.
*E04H 12/00* (2006.01)
(52) U.S. Cl. ..................... 52/651.07; 52/848
(58) Field of Classification Search .............. 52/82, 52/192, 651.01, 836, 842, 843, 844, 845, 52/848, 849, 855, 80.1, 81.4, 651.07, 245, 52/249

See application file for complete search history.

(56) References Cited

U.S. PATENT DOCUMENTS

| | | | | |
|---|---|---|---|---|
| 1,265,966 A | * | 5/1918 | Schlafly | 52/245 |
| 1,765,946 A | * | 6/1930 | Shea | 220/565 |
| 3,193,129 A | * | 7/1965 | Pfluger et al. | 220/4.16 |
| 3,561,890 A | * | 2/1971 | Peterson | 417/336 |
| 3,935,633 A | | 2/1976 | Bunker | |
| 6,715,243 B1 | * | 4/2004 | Fons | 52/192 |
| 2002/0064434 A1 | * | 5/2002 | French | 410/37 |

FOREIGN PATENT DOCUMENTS

| | | |
|---|---|---|
| DE | 1031952 | 6/1958 |
| DE | 3842026 | 7/1990 |
| GB | 1597534 | 9/1981 |
| WO | WO 0212657 | 2/2002 |

* cited by examiner

*Primary Examiner*—Richard E Chilcot, Jr.
*Assistant Examiner*—Jessica Laux
(74) *Attorney, Agent, or Firm*—Stites & Harbison PLLC; Douglas E. Jackson

(57) ABSTRACT

In order to transport large size windmill towers, the invention suggests a steel tower (1) for a windmill, comprising a number of cylindrical or tapered tower sections (2), at least the wider sections (2) of which being subdivided into two or more elongated shell segments (3), which combine into a complete tower section (2) by means of vertical flanges (6) tightened together, e.g., by bolts (10), said shells being also provided with upper and lower horizontal flanges (4), respectively, to allow interconnection of tower sections (2) one on top of the other.

15 Claims, 2 Drawing Sheets

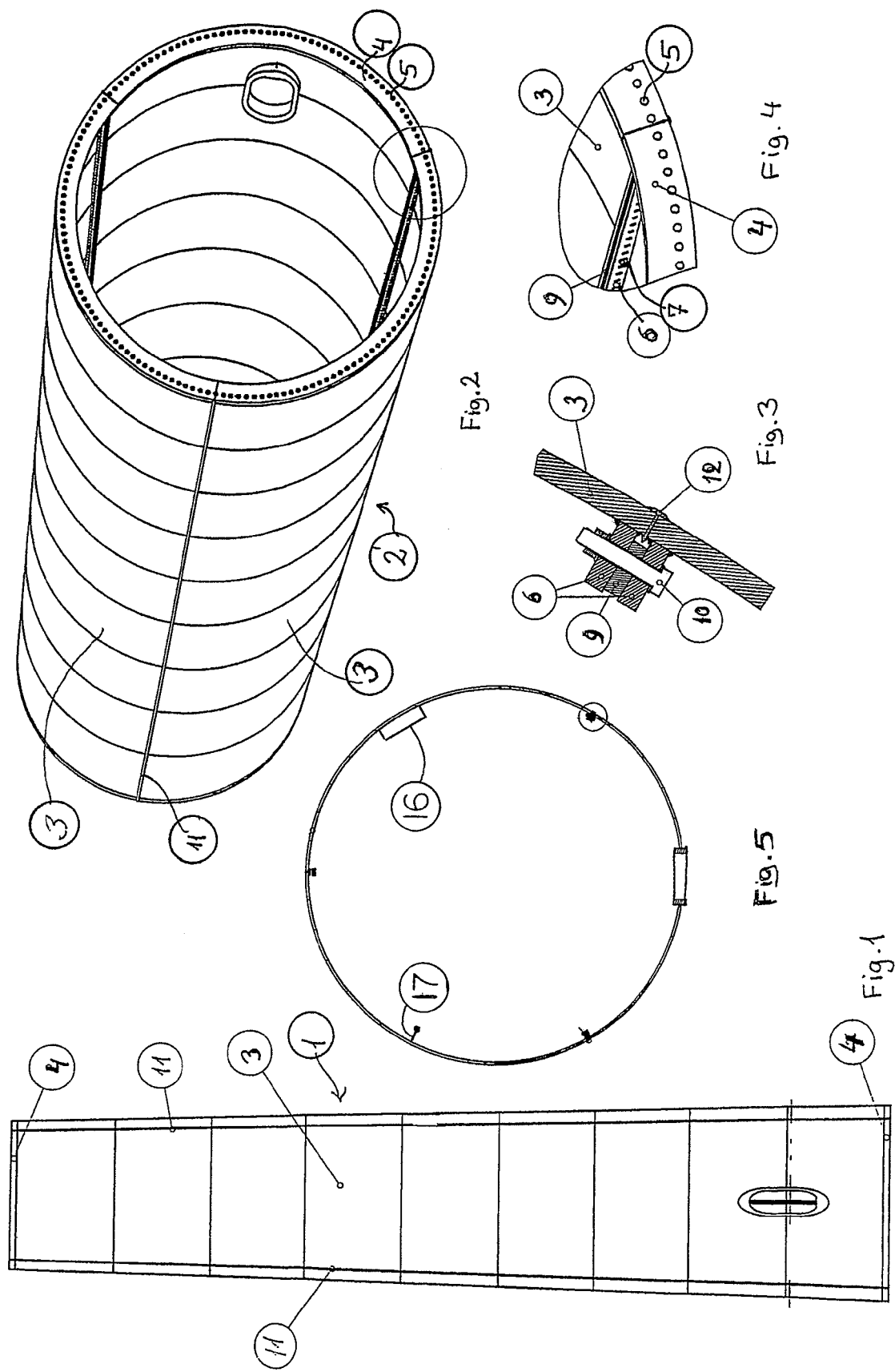

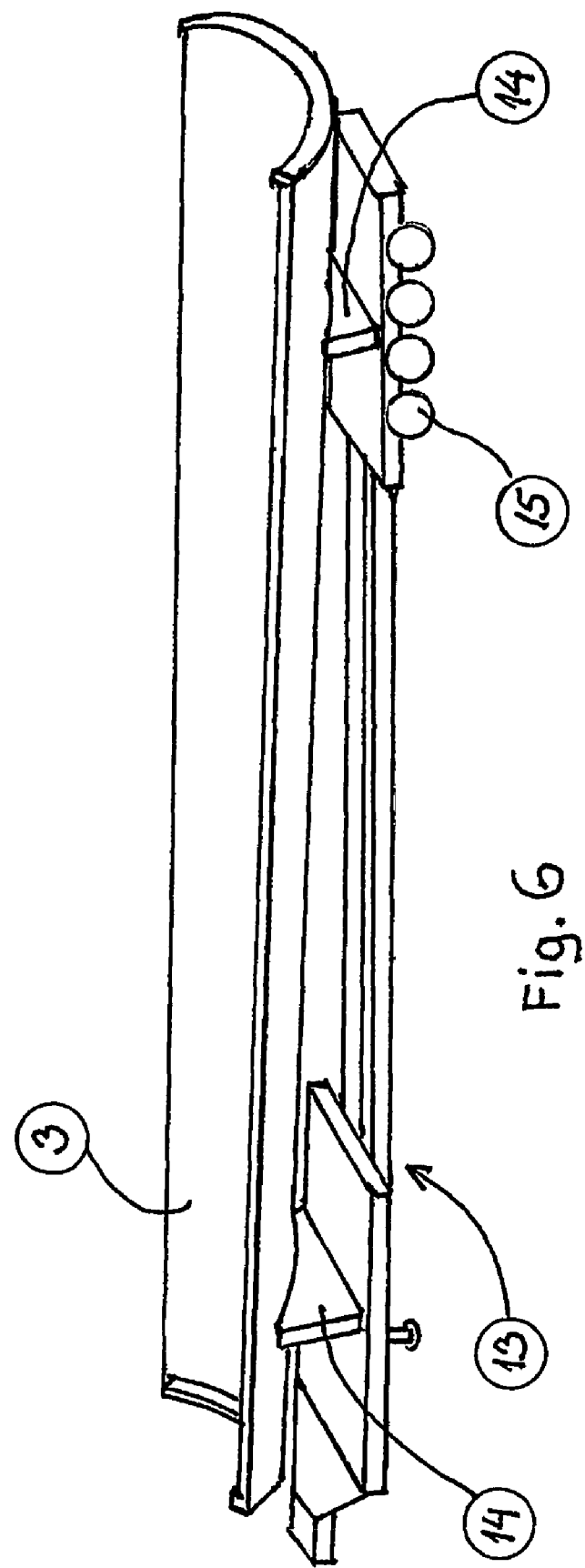

METHOD OF CONSTRUCTING LARGE TOWERS FOR WIND TURBINES

FIELD OF THE INVENTION

The invention relates to large size windmill towers of single-walled steel tower sections, each being comprised of prefabricated shell segments For many years it has been common practice to build steel tower sections separately in a workshop facility and then to move each complete section to the site, where the windmill installation is to be performed. The tower sections would typically have a cylindrical or slightly tapered shape, and each of the sections could in turn be divided along axial lines into an adequate number of shells.

Due to the ever-increasing demand for larger capacity windmills and consequently larger dimensions of all parts needed to build such mills, a physical limit imposed by the infrastructure, e.g. the clearance beneath a bridge or in a tunnel, is reached.

Accordingly, the idea of subdividing tower structures in order to ease the transportation thereof would be an obvious solution to suggest.

PRIOR ART

The published DE 198 32 921 describes a tower structure especially for a windmill, having a bottom diameter larger than 6 m, which tower comprises inner and outer shell segments of steel to be mounted on site, whereupon concrete is deposited in the space between the inner and outer shells in order to establish the necessary strength to withstand the impact from wind pressure and the mill head.

In the prior art tower it is claimed that the inner and outer shells cooperate with the core of concrete in providing the required load-bearing capacity.

Moreover, each of the shell segments is provided with vertical and horizontal angle edges having a number of throughholes for interconnecting the segments by means of e.g. bolts. This serves the purpose of providing some horizontal stiffness needed for the shell segments to be used as shutter walls.

The wind load increases as the square of the wind speed and consequently, the higher the mill towers are, the stronger should the structure be dimensioned, which in turn means that either the wall thickness should be increased or the diameter.

Defining the optimal diameter based on load-carrying capacity, stiffness and natural frequencies, the diameters of larger tower structures would exceed allowed transportation limitations in terms of vertical and horizontal size. The reasons for requiring larger diameters are to be found in that strength and stiffness increase with the thickness of the steel plate by the power of one, while in relation to the diameter they increase by a power of two and a power of three, respectively. The mathematical explanation, wherein D represents the mean diameter and t is the thickness, being that the load-bearing capacity corresponds to the moment of resistance, $$Q=(\pi/4) \times D^2 \times t,$$

while the stiffness (or deflection) corresponds to the moment of inertia, $$I=(\pi/8) \times D^3 \times t.$$

So, it is more advantageous to increase the tower diameter than the plate thickness.

Increased thickness would mean higher material costs and a requirement for heavier transportation vehicles, be it trucks, trains, ships or helicopters, while diameters need to be small enough to allow for vehicle heights not exceeding typically 4.20 m in order to pass under bridges and through tunnels.

In order to compromise and take advantage of increased diameters, the too wide sections need to be split along vertical lines, so the shells can be laid down lengthwise with a load height suitable for transportation.

However, such solution has the disadvantage of claiming a larger amount of manual work on inappropriate places and maybe adding supporting structures to the subparts, which is the reason why this has not been considered a profitable solution.

DISCLOSURE OF THE INVENTION

It is an object of the invention to provide for a large diameter tower structure for a windmill maintaining or lowering the all-inclusive costs of a structure as installed, and which tower allows for transportation abiding by the typical logistic limitations.

Another object of the invention is to provide a method of preparing the building elements of a tower and transporting same on a huge trailer after a truck, on a barge after a ship or transport via airborne carriers

SUMMARY OF THE INVENTION

According to the invention, one these objects is achieved by a steel tower for a windmill, comprising a number of cylindrical or tapered tower sections, at least the wider sections being subdivided into two or more elongated shell segments, which combine into a complete tower section by means of vertical flanges tightened together e.g. by bolts, said shells being also provided with upper and lower horizontal flanges, respectively, to allow interconnection of tower sections one on top of the other.

Moreover, another advantage of the invention is achieved by a method of building a large size, cylindrical or tapered tower for a windmill, of single-walled steel tower sections from prefabricated shell segments, whereby at least the wider sections are divided into segments along vertical lines and interconnected by flanges provided along the edges thereof, comprising the steps of:

a) providing two or more tower shell segments from a rolled steel plate having the required radius of curvature, said shells forming in unison a complete circumferential tower section, b) providing each shell segment with vertical and horizontal connecting flanges along free edges thereof, c) mounting one or more shell segments on a transportation carriage, d) transporting said supported segments to the building site, e) mounting the shell segments together along their vertical flanges to provide a tower section by connecting means, e.g. bolts, f) mounting tower sections on top of each other by connecting them along their opposing horizontal flanges by connecting means, e.g. bolts.

In an advantageous embodiment of the method, the rolled steel plate constituting a 360° shell is being welded together to form a cylindrical or tapered tower section, whereupon said section is cut into the number of elongated shell segments required.

In another advantageous embodiment of the method and previous to step a), a number of rolled elongated shell segments are being welded together along their abutting horizontal edges to establish larger lengths of tower shell segments.

Furthermore, the method will preferably include the flanges in step b) being welded in a position pointing towards the center of the tower. This leaves a smooth outer surface of the tower.

The vertical flanges are preferably being welded in such distance from the edge of the respective shell that a spacer bar could be sandwiched between the flanges as they are tightened together. A vertical joint visible after interconnecting two neighbour shells via a spacer bar is preferably being covered by inserting a filler material and/or a filler element.

In a preferred method according to the invention, interconnection of horizontal flanges is performed after offsetting the vertical division lines of neighbour tower sections. Also fitting out each shell with necessary ladders etc. should preferably be performed before transportation to the site, thereby reducing on-site work as much as possible.

Finally, all parts of the tower structure is preferably being surface treated in the workshop before transportation in order to make the best resistance against the aggressive environmental conditions that often prevail at windmill sites.

A preferred embodiment of the tower shows that at least one of the tower sections is being divided into three segments of essentially equal arc length, i.e. 120° each.

In order to provide a satisfactory and practical length of shell segment to be transported, such segment could advantageously be comprised of at least two lengths of segments welded together along their abutting horizontal edges and being fitted with horizontal flanges along the uppermost and lowermost free edges, said flanges being provided with a number of throughholes for interconnecting bolts.

In an improved embodiment of the invention, the vertical flanges are welded onto the shell segments offset from the corresponding edges by a distance leaving a space between opposing surfaces of flanges for a spacer bar sandwiched between them, as flanges are bolted together, which will allow a strong and secure connection. Said spacer bar could be provided with throughholes matching the holes in the flanges, and preferably each hole in the spacer bar would have a notch extending from the edge of the bar into the hole and wide enough to allow lateral sliding over a bolt.

A smooth outer surface of the tower is achieved if the vertical and/or horizontal joints between segments and sections, respectively, are being covered by inserting a filler material and/or a filler element.

A time-saving aspect of operating with shell segments is that they can conveniently be provided with fitting out in the form of e.g. ladder sections and cable fixtures before being transported to the building site.

The transportation would preferably be provided by land haulage with a truck having a suitable "trailer" or carriage on wheels, e.g. in the form of a support frame with a number of supports carrying a shell segment length ready for transportation. Also other forms of supporting frames placed onboard trains or ships could be considered for transportation. With a helicopter, the shell segment might be lifted directly by the ends thereof and transported to the site.

The tower according to the invention and the method described to build such tower are offering remarkably economical savings in terms of present and future large diameter towers requested by the wind energy sector, and the towers are immediately operable as they could be fitted out with all installations before leaving the workshop, so they only need to be connected on site.

BRIEF DESCRIPTION OF THE DRAWINGS

An example of an advantageous embodiment of the tower and the method according to the invention is being described below with reference to the accompanying drawings, in which:

FIG. 1 is an elevated side view of one out of three shell segments of a windmill tower section according to the invention, and consisting of several lengths of shells welded together one after the other, FIG. 2 is a perspective view of a tower section consisting of three segments bolted together in lateral direction, FIG. 3 is a detailed view of a vertical flange connection inside the tower section, extending perpendicular to the plane of the drawing, FIG. 4 is a detailed view of horizontal and vertical flanges, respectively, encircled in FIG. 2, FIG. 5 is a cross sectional view showing a tower section comprised of three shell segments, and FIG. 6 is a shell segment ready for haulage by a truck.

DETAILED DESCRIPTION OF THE INVENTION

A shell segment of a windmill tower built according to the invention is shown in FIG. 1 and further details are shown in FIGS. 2-5. The tower comprises a number of shell segments 1 of rolled steel plates, which bolted together side-by-side make up complete circumferential tower sections 2 (see FIGS. 2 and 5), said sections being secured one on top of another by bolts (see FIGS. 3 and 4). In FIG. 2, a segment 3 shows several lengths 3 of shell welded together along abutting upper and lower edges. Each top and bottom edge of a combined length of shell segments 3 are provided with a plane flange 4 extending inwardly and carrying a large number of throughholes 5 to receive corresponding bolts for tightening sections securely together.

Plane vertical flanges 6 provided with a large number of throughholes 7 are welded in such distance from the edge of the respective shell that an elongated spacer bar 9 could be sandwiched between the vertical flanges 6, as they are tightened together by means of bolts 10.

On the outside of the tower, vertical joints 11 are visible until the joint is filled with a filler material and/or a filler element 12.

In a similar manner, the horizontal joints between sections could be made invisible.

In a practical embodiment of the method according to the invention, a tower shell segment is equipped with e.g. a ladder section 16 or cable fixtures 17 before being transported to the building site. Such transportation being carried out by placing a shell segment on supports 14, which in turn are placed on a supporting frame or structure 13, preferably being moveable by means of wheels 15 (FIG. 6) of a transportation carriage and a truck (not shown).

It is obvious that the number of shell segments, into which a section is divided, can be determined considering the limitations imposed by the infrastructure; meaning low bridges, narrow tunnels, etc.

Further, the choice of connection means is in no way restricted to being bolts and nuts, but they are common and suitable means, especially also in order to take advantage of the prefabricated surface treatment, which should be kept intact.

The invention claimed is:

1. A windmill comprising:
   a number of cylindrical or tapered tower sections which are configured to support the windmill, at least some of the tower sections being subdivided into two or more associated elongated shell segments, which associated shell segments are adapted to combine into a complete tower section, inwardly-extending vertical flanges provided on each of the associated shell segments which vertical flanges are connected together to form an associated complete tower section, wherein the vertical flanges are welded onto the shell segments offset from the side edges of the respective shell segments such that a space is provided between opposing surfaces of adjacent vertical flanges, wherein a spacer bar is sandwiched between the adjacent vertical flanges, and wherein the adjacent vertical flanges with the spacer bar therebetween are bolted together, and inwardly-extending upper and lower horizontal flanges provided, respectively, on said associated shell segments for interconnection of the tower sections one on top of the other to support the windmill.

2. A windmill according to claim 1, wherein at least one of the tower sections is divided into three associated shell segments of essentially equal arc length.

3. A windmill according to claim 1, wherein at least one of the shell segments comprises lengths of rolled steel plate joined together along abutting horizontal edges by welds such that the vertical flanges of the associated shell segment run along side edges of each length of the rolled steel plate and the horizontal flanges of the associated shell segment run along the free edges on uppermost and lowermost lengths of rolled steel plates, said vertical and horizontal flanges being provided with a number of throughholes for interconnecting bolts.

4. A windmill according to claim 1, wherein said spacer bar is provided with throughholes matching the holes in the flanges, and each throughhole in the spacer bar has a notch extending from the edge of the bar into the throughhole and wide enough to allow lateral sliding of the spacer bar over a bolt.

5. A windmill according to claim 4, wherein the vertical and/or horizontal joints between shell segments and tower sections, respectively, are covered by a filler material or a filler element.

6. A windmill according to claim 1, wherein at least one shell segment includes a ladder section and cable fixtures before being transported to the building site.

7. A method of building a large size, cylindrical or tapered tower for a windmill, of single-walled steel tower sections from prefabricated shell segments, comprising the steps of:

fabricating two or more shell segments from a rolled steel plate having a desired radius of curvature such that said shell segments form in unison a complete circumferential tower section, said fabricating step including providing each shell segment with vertical and horizontal flanges along free edges thereof extending inwardly relative to the radius of curvature, mounting one or more of the shell segments on a transportation carriage or supporting frame, transporting the one or more shell segments mounted on the transportation carriage or supporting frame to a building site, connecting the shell segments together at the building site with connecting devices along their vertical flanges to provide one or more tower sections, mounting tower sections on top of each other at the building site by connecting them along their opposing horizontal flanges with connecting devices, and supporting a windmill with the tower sections.

8. A method according to claim 7, wherein said fabricating step includes the steps of forming a rolled steel plate in the form of a 360° shell, welding the 360° shell together to form a cylindrical or tapered tower section, and dividing the tower section into a number of elongated shell segments.

9. A method according to claim 7:

wherein said fabricating step includes the steps of fabricating groups of two or more different length shell segments, wherein the connecting step includes the steps of:
connecting two or more shell segments of one group together along their abutting horizontal edges to form a first complete tower section with a first circumferential length, and connecting two or more shell segments from two different groups together along their abutting horizontal edges to establish a second complete tower section with a second circumferential length.

10. A method according to claim 7, wherein said connecting step includes the step of welding the vertical and horizontal flanges of adjacent shell segments together in a position pointing towards the center of the tower.

11. A method according to claim 7:

wherein said providing each shell segment with vertical and horizontal flanges along free edges step includes the step of welding the vertical flanges onto the shell segments offset from side edges of the respective shell segments such that a space is provided between opposing surfaces of adjacent vertical flanges, and wherein said connecting step includes the step of positioning a spacer bar between at least some of the opposing surfaces of adjacent vertical flanges so that the spacer bar remains positioned between the opposing surfaces of the adjacent vertical flanges as the adjacent vertical flanges are connected together.

12. A method according to claim 11, wherein a vertical joint is visible after said connecting step of the opposing surfaces of the adjacent vertical flanges with the spacer bar therebetween, and further including the step of inserting a filler material or a filler element between the adjacent vertical flanges to cover the vertical joint.

13. A method according to claim 7, wherein said mounting tower section step includes the step of interconnecting horizontal flanges of adjacent tower sections after offsetting vertical division lines of the shell segments of the adjacent tower sections.

14. A method according to claim 7, further comprising the step of equipping at least one shell segment with a ladder section or a cable fixture before said transporting step.

15. A method according to claim 7, further including the step of surface treating the shell segments in a workshop before said transporting step.

* * * * *